Oct. 19, 1937. W. A. BARR 2,096,420
GATE VALVE
Filed April 20, 1935 2 Sheets-Sheet 2

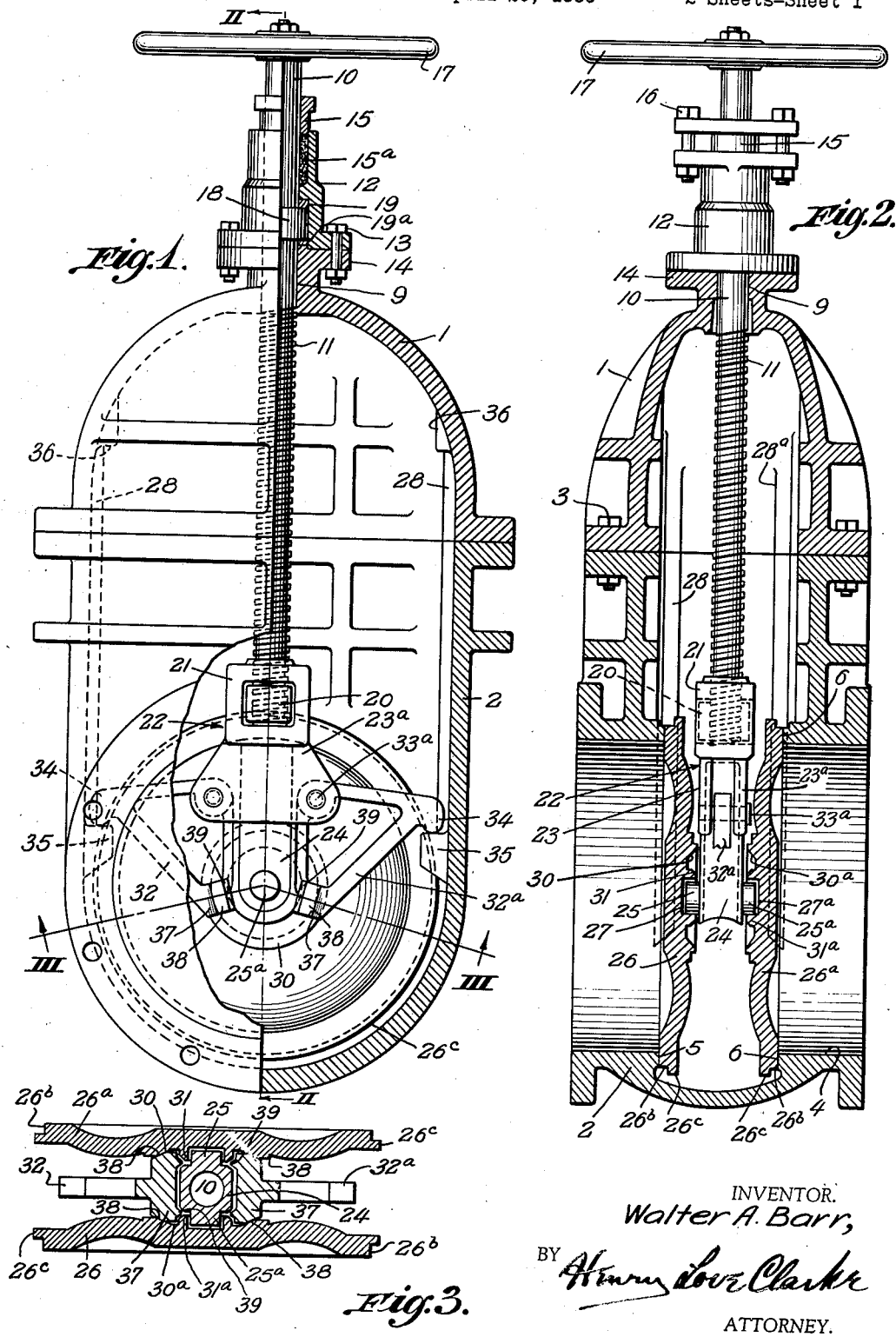

INVENTOR
Walter A. Barr,
BY Henry Love Clarke
ATTORNEY

Patented Oct. 19, 1937

2,096,420

UNITED STATES PATENT OFFICE 2,096,420

GATE VALVE

Walter A. Barr, Fort Wayne, Ind., assignor, by mesne assignments, to Koppers Company, a corporation of Delaware Application April 20, 1935, Serial No. 17,432

4 Claims. (Cl. 251—68)

The invention relates to valves and more particularly to gate valves of the double disk type both for gas and for liquids such as water, and has for its objects to provide novel and improved means for insuring proper and fluid tight seating of the valve disks against their respective seats when in closed position, as well as for locking the valve disks against vibration and chattering when in open position and when said disks are being moved to either open or closed position.

An important object of the invention is to provide a valve structure of the character described wherein the nature and arrangement of parts are such as to promote high efficiency, long life and ease of operation regardless of the position or direction of movement of the valve in any of various types of apparatus or conduits in which said valve structure may be installed, the flat, edgewise or other position of the valve structure in a particular installation being of course determined by the requirements of such individual instance. The necessity for supplemental rollers and other appurtenances when the valve is inclined or placed horizontally or edgewise in certain installations, is thereby rendered unnecessary.

A further object of the invention is to provide a gate valve structure in which the companion valve disks are centrally mounted for free rotation relative to their supports, thereby imparting self-cleaning and self-seating attributes to the disks as well as minimizing and equalizing wear and distributing the same over the entire peripheral seating area of the valve disks.

The invention also contemplates a valve structure in which the mechanism for insuring fluid tight seating of the valve disks is designed and arranged to operate and release quickly at predetermined intervals in seating and unseating the disks, thereby utilizing the thrust of the valve stem to best advantage in seating the disks, and obtaining quick unseating without sticking or freezing and with a minimum of effort, when it is desired to move the valve towards open position.

A further object of the invention is to eliminate the necessity and expense of employing in gas valves brass strips or similar parts where frictional contact is exerted, in order to insure ease of operation, and the frictional contact to seat the valve and to hold the disks against vibration and play when in open position and during movement, is distributed over varying and different portions of the valve disks, rather than continuously against the same portions thereof. The advantages of such an assembly will be obvious in promoting efficiency of operation and long life of the parts even under strenuous usage. The entire valve structure consists of few parts simply and compactly arranged, which is an added practical and economical advantage.

In addition to the general objects recited above the invention includes among its objects such other improvements and advantages in construction and operation as are found to obtain in the structure and devices hereinafter described or claimed.

In the accompanying drawings, forming a part of this specification, and showing, for purposes of exemplification, a preferred form and manner in which the invention may be embodied and practiced, but without limiting the claimed invention specifically to such illustrated instance or instances:

Figure 1 is a view in front elevation, partly in vertical section, of a gate valve structure and assembly constituting a preferred embodiment of the invention, the valve being illustrated in substantially closed position and designed for valves subject to vibration such as gas inlets and outlets of exhausters or compressors and the exhaust valves of gas or oil engines.

Fig. 2 is a central vertical section on line II—II of Fig. 1.

Fig. 3 is a transverse section on line III—III of Fig. 1.

Fig. 4 is a central vertical section similar to Fig. 2 but of the valve adapted for water works, filtration plants and the like.

Figure 4:
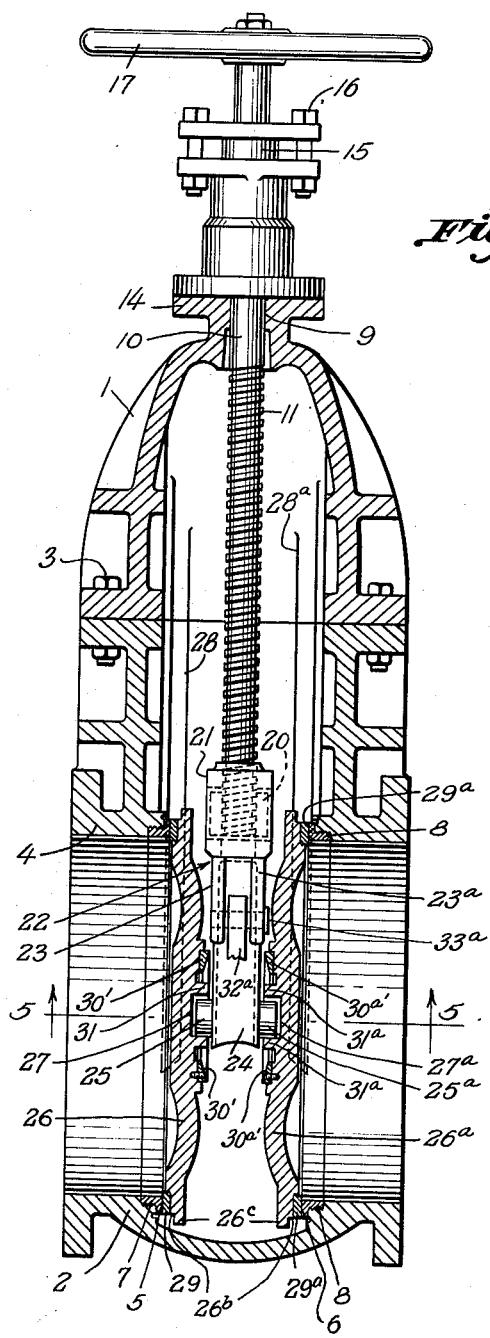
Figure 5:
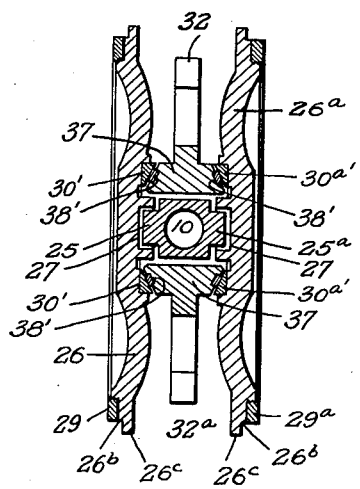
Fig. 5 is a transverse section on line 5—5 of Fig. 4.

Referring to the drawings, the improved valve structure includes a flanged housing member 1 and a companion housing member 2, suitably secured together when in assembled relation as by bolts 3 or other fastening means. The housing member 2 is apertured at 4 so as to constitute a part of the gas or other fluid conduit (not shown) in which the valve assembly is designed to be installed. The apertured portion 4 of the housing member 2 is further provided with a pair of inner and oppositely disposed spaced annular valve seats 5 and 6 which, in case the valve is for water works as in Figs. 4 and 5, is cut away and threaded as illustrated for the reception of removable bronze annular wear plates or rings 7 and 8 respectively.

The housing member 1 is centrally apertured at 9 for the reception therethrough of a valve stem 10 having a threaded portion 11, and a suitable flanged bearing member 12 is removably secured as by bolts 13 to a correspondingly flanged portion 14 of the valve housing member 1. A gland member or stuffing box 15 is adjustably maintained in engagement with a packing 15a within the bearing member 12, by means of bolts 16. The valve stem 10 is provided at its outer end with a hand or other operating wheel 17 rigidly secured thereto and is rotatively supported and maintained against axial displacement relative to the housing by means of an enlarged portion 18 thereof engaging spaced antifriction bearing rings 19, 19a or the like housed within the bearing member 12.

The inner portion of the valve stem 10 extends through and has threaded engagement with a nut 20, preferably formed of brass or other anti-friction metal for gas valves and bronze for water works valves, said nut being seated and held against rotation within a laterally and axially apertured portion 21 of a yoke member indicated generally at 22, through which the inner end of the valve stem loosely extends. Said yoke member further includes a pair of spaced depending arms or ears 23, 23a and a central extended or depending portion 24 apertured for the loose reception of the lower end of the valve stem and provided with outwardly projecting bearing members or trunnions 25, 25a. All of the described portions constituting the yoke member 22 may be cast as a unit if desired or may be otherwise assembled.

A pair of companion valve members or disks 26, 26a are each centrally recessed as at 27, 27a to provide bearing portions for loose support and free rotation on the trunnions 25, 25a respectively of the yoke member 22. Said valve disks are further provided with peripheral tread portions 26b, and flanges 26c designed to engage diametrically opposed and spaced pairs of rail members or guides 28, 28a respectively, integrally formed as a part of, or otherwise secured to and within the companion valve housing members 1 and 2. For water works, as shown in Figs. 4 and 5, the valve disks are provided with removable annular bronze wear plates or ring members 29, 29a respectively, designed for close fitting and fluid tight engagement with the corresponding removable wear plates 7 and 8 of the respective valve seats when the valve is in closed position.

The valve disks are or may be machined to provide the same with centrally disposed annular conical friction ring surfaces 30, 30a respectively, and in the valves of Figs. 4 and 5 are provided with correspondingly shaped replaceable bronze wear pads 30' and 30a', and in the valves primarily for gas of Figs. 1 to 3, but not the valves primarily for water works of Figs. 4 and 5, friction surfaces preferably terminate in machined conical or beveled annular shoulder portions 31, 31a immediately adjacent and surrounding the trunnions 25, 25a respectively of the yoke member 22 (Fig 3). In Figs. 4 and 5 the portions 31, 31a are not beveled or conical, and upper lugs 36 preferably omitted.

A pair of oppositely projecting and depending wedge arms 32, 32a of substantially triangular configuration are loosely and pivotally mounted, preferably on anti-friction bearings or pins 33, 33a between the spaced arms 23, 23a of the yoke member.

The said wedge arms are identical in construction and in their manner of operation and each includes an outwardly extending lug member 34 designed to contact with a projection 35 on the valve casing member 2 at about the level of the pivotal connection 33a of the arms 32, 33, to the yoke member 22 and between the trunnions 25, 25a, and the perimeters 26b of the disks 26, 26a, at or near the closed position of the valve, and, in Figs. 1 to 3 but not Figs. 4 and 5, with a second lug or projection 36 on the valve casing member 1 at or near the open position of the valve disks. Each wedge arm 32, 32a is further provided with an enlarged wedging portion 37 provided with oppositely tapered wedge faces 38 arranged to contact with and frictionally engage the annular or ring shaped conical friction surfaces 30, 30a of the valve disks respectively, irrespective of the position of the latter on the trunnions 25, 25a with respect to which the disks are freely rotatable, and as shown in Figs. 1–3 to contact below the radial centerline of the valve disks 26, 26a, at the closed position of the valve, so that the first movement of the stem 11 tending to open the valve causes the wedges to move nearer the radial center of the conical disks both in an upward and an inward direction which unlocks the wedge and frees the valve very easily, and so that practically all of the downward force on the stem 11 is applied to the wedge arm extremities 34 causing it to rotate and wedge the disks apart and the arms 32, 32a to lock after the disks are over the valve ports, and unlock before the disks move over their seats in opening; thus the effort required to open the valve is much less than the effort to close it. In the valve of Figs. 4 and 5, the wedge faces 38 of the wedge arms are provided with replaceable friction wear pads 38' designed to cooperate with the described conical wear pads provided on the conical friction surfaces 30', 30a' of the valve disks. The enlarged wedging portion 37 of each wedge arm 32, 32a of Figs. 1 to 3 is further provided with inwardly extending oppositely tapered portions 39 designed to co-operate with the correspondingly tapered shoulder portions 31, 31a of the valve disks, said wedging portions 39 of the wedge arms being designed to move between the valve disks and the adjacent portion 24 of the yoke member on which said disks are rotatably supported (Fig. 3).

The operation of the described valve structure is as follows: During the travel of the disks from open to closed positions and vice versa, the valve disks are free to rotate on their trunnions and in contact with the guide rails and there is no appreciable frictional contact present between the wedging portions 37 of the respective wedge arms 32, 32a and the valve disks. As shown in the drawings the valve disks are moved downwardly to closed position to shut off the flow of fluid through the conduit 4, by rotation of the hand wheel 17 and threaded valve stem 10. The yoke member 22 and wedge arms and valve disks supported thereby move downwardly relative to the stem by reason of the anti-friction engagement of threaded nut 20, carried by the yoke, with the threaded portion 11 of the valve stem. At or near the limit of downward travel of the disks, lugs 34 of the pivotally mounted wedge arms 32, 32a engage the oppositely disposed projections 35 of the valve casing and swing or partially rotate said wedge arms on their pivotal bearings 33, 33a, wedge arm 32 swinging in a clockwise direction and wedge arm 32a in a counterclockwise direction as viewed in Figure 1. This results in outward movement of the wedge portions 37 of each wedge arm away from the center of the valve disks resulting in a tight frictional engagement of wedge faces 38 of the former with the conical friction surfaces 30, 30a of the valve disks. Such engagement will effectually urge the valve disks away from each other and tightly against their respective seats 5 and 6 to insure against the leakage of fluid and serving to maintain the valve disk members in firm and secure engagement with their seats as long as the valve is in closed position. As indicated in Figure 2 the guide rail members 28, 28a may diverge slightly outwardly towards their lower ends or sufficient play is permitted so that the flanges 26c of the valve disks will not engage the rails and prevent tight seating of the disks under the influence of the wedge arms.

When the valve is removed to open position by a reverse rotation of hand wheel 17 and valve stem 10, a corresponding oppositely swinging movement of each wedge arm 32, 32a is immediately obtained to release the same from wedging engagement with the valve disks and to permit the latter to be freely and bodily moved upwardly towards open position on continued rotation of the hand wheel 17. At or near the conclusion of such upward movement of the structure of Figs. 1 to 3 but not the structure of Figs. 4 and 5, and lugs 34 of the wedge arms engage the oppositely disposed stops or projections 36 of the valve casing, which swings said wedge arms inwardly on their pivotal supports and toward the center of the valve disks. This results in inwardly projecting tapered wedge portions 39 of the wedge arms engaging the conical shoulders 31, 31a of the valve disks to spread the disks outwardly away from one another and tightly clamp the peripheral flanges 26c thereof against the guide rails 28, 28a at diametrically opposed locations on the periphery of each valve disk. This described action of the wedge arms 32, 32a at or near the limit of the upward movement, securely holds the valve disks against chattering or vibration when and as long as the valve is in open position.

During movement of the valve towards and away from its seating position, the unbalanced weight of the wedge arms 32, 32a (Fig. 1) is such that the wedging portions 39 thereof tend to move inwardly (Fig. 3) under the influence of gravity, and toward the center of the valve disks. This results in the tendency to urge the valve disks away from each other and against the guide rails 28 to take up any looseness or play and insure against any chattering or vibration during movement of the valve disks towards or away from their seats.

From the described structure and arrangement it will be noted that the free central pivotal mounting of the valve disks and their flanged engagement with the guide members or rails 28, permits installation of the valve assembly in any desired position without affecting or detracting from ease of operation. The described central mounting of the disks insures secure seating in different peripheral positions relative to their seats on each actuation of the valve. This minimizes and equalizes wear on the valve disks as well as rendering the same practically self-cleaning and self-seating. Any foreign obstruction will be dislodged. The free rotation of the valve disks during operation insures that the wedging action in both closed and open positions will occur at various locations on the machined conical wear surfaces or rings 30, 30a, and 31 thereof, thereby equalizing and minimizing wear on the valve disks in every location where such friction or wedging action is applied. As the loosely mounted disk members rotate during actuation, a new frictional as well as seating surface is presented each time the valve closes and opens, thus increasing the life of the valve.

It will be further noted that the friction or wedging portions 37 of the wedge arms 32, 32a are located below the center line of the valve disks so that the initial movement in opening the valve moves the wedges inwardly toward the center of the conical friction surfaces 30, 30a (30' and 30a') both in an upward and inward direction, which results in the valve being readily loosened or freed from its seat with a minimum effort. The described construction also eliminates all friction resulting from sliding contact and enables practically all of the final downward thrusts of the valve stem to be applied directly to wedge arms 32, 32a and utilized in forcing the valve disks apart and closely against their seats. The construction permits the elimination of supplemental parts, such as brass strips ordinarily required between sliding contact surfaces within the valve structure, and such strips are unnecessary to insure the effectual manipulation and seating of the valve with a minimum of thrust and effort.

The bronze seat rings, the bronze rings on the disks and the bronze wedges and rings in the backs of the disks, together with the bronze stems and nuts on the structure illustrated in Figs. 4 and 5 are not required in valves for gas lines as shown in Figs. 1 to 3, but are required for water works and filtration valves shown in Figs. 4 and 5 because the corrosion of cast iron and the formation of lime growths on cast iron surfaces make it necessary to use some material which like bronze, will not be corroded or form a starting point for the collection of stone-like projections. The wedge surfaces 39 and upper lugs 36 of Figs. 1 to 3 are not required in water works valves but are usually only used on valves subject to vibration such as on inlets and outlets of exhausters or compressors and the exhaust valves of gas or oil engines.

What is claimed is:

1. In a gate valve structure, the combination of a valve housing having a fluid conduit and a pair of spaced valve seats in said conduit, a valve actuating means extending into said housing, a valve member including a pair of spaced valve disks each centrally supported for free rotation by the valve actuating means and arranged to register with said valve seats respectively when the valve is closed, spaced pairs of cooperating cam surfaces on the inner faces of the valve disks, a pair of wedging arms pivotally supported by the valve actuating means between said valve disks and on opposite sides of their central supports, each of said arms having spaced wedge portions extending in opposite directions, means on the valve housing for engaging said arms during movement of the valve to closed position to swing the arms on their pivots and frictionally engage corresponding wedge portions thereof with one pair of cooperating cam surfaces on the valve disks, whereby the disks are forced in opposite directions and firmly into fluid tight engagement with their respective valve seats, and means on the valve housing for engaging said arms during movement of the valve to open position to swing the arms on their pivots and frictionally engage the other of said wedge portions with the other of said cooperating cam surfaces of the valve disks to maintain the latter against movement when the valve is in open position.

2. In a gate valve structure, the combination of a valve housing having a fluid conduit and a pair of spaced valve seats in said conduit, a valve actuating means extending into said housing, a valve member including a pair of spaced valve disks each centrally supported for free rotation by the valve actuating means and arranged to register with said valve seats respectively when the valve is closed, spaced pairs of cooperating cam surfaces on the inner faces of the valve disks, a wedging arm pivotally supported by the valve actuating means between said valve disks, said arm having spaced wedge portions extending in opposite directions, means for engaging said arm during movement of the valve to closed position to swing the arm on its pivot and frictionally engage one of said wedge portions with one pair of cooperating cam surfaces on the valve disks, whereby the disks are forced in opposite directions and firmly into fluid tight engagement with their respective valve seats, and means for engaging said arm during movement of the valve to open position to swing the arm on its pivot and frictionally engage the other of said wedge portions with the other of said cooperating cam surfaces of the valve disks to maintain the latter against movement when the valve is in open position.

3. In a gate-valve structure in combination with a valve housing having a fluid conduit and a pair of spaced valve seats in said conduit: a valve actuating means extending into said housing, a pair of spaced substantially parallel valve disks each having a cam surface thereon and each centrally supported for free rotation by the valve actuating means and arranged to register with said valve seats respectively when the valve is closed; a pair of oppositely disposed elbow levers pivotally suspended at their elbows from said valve actuating means above the central supports for the disks and between the latter; said levers each having a depending cam arm with a cam engageable with the cam surfaces on the disks and a fulcrum arm at an angle to said cam arm and terminating in a plane above the central supports for engagement with a fulcrum on the housing, for urging the disks apart to firmly seat the same on the valve seats under pressure of the valve actuating means on the elbows when the valve is in closed position; and oppositely disposed fulcrums on the housing at about the level of the pivotal connection of the elbow levers to the valve actuating means in closed position of the valve for actuating said fulcrum arms to move the cam arms about their elbow connections into wedging engagement with the disks in seating the valve disks.

4. In a gate-valve structure, in combination with a valve housing having a fluid conduit and a pair of spaced valve seats in said conduit; a valve actuating means extending into said housing; a pair of spaced substantially parallel valve disks each having a cam surface thereon and each centrally supported for free rotation by the valve actuating means and arranged to register with said valve seats respectively when the valve is closed; guide members in the housing engaging the valve disks to guide them in their movement to and from seat engaging position; a pair of oppositely disposed elbow levers pivotally suspended at their elbows from said valve actuating means above the central supports for the disks and between the latter; said levers each having a depending cam arm with a cam engageable with the cam surfaces on the disks and a fulcrum arm at an angle to said cam arm for engagement with a fulcrum on the housing, for urging the disks apart to firmly seat the same on the valve seats under pressure of the valve actuating means on the elbows when the valve is in closed position; oppositely disposed fulcrums on the housing at about the level of the pivotal connection of the elbow levers to the valve actuating means in closed position of the valve, for actuating said fulcrum arms to move the cam arms about their elbow connections into wedging engagement with the disks in seating the valve disks; said cam arms having further cam surfaces adapted to be moved by the weight of said fulcrum arms into engagement with said disks to urge the disks into firm sliding engagement with said guide members when the pivoted elbow is raised by retraction of the valve actuating means from valve closed position.

WALTER A. BARR.